United States Patent
Bruso et al.

(10) Patent No.: US 11,386,084 B2
(45) Date of Patent: Jul. 12, 2022

(54) SYSTEMS AND METHODS FOR DERIVING DATABASE SEMANTIC INFORMATION USING ARTIFICIAL INTELLIGENCE

(71) Applicants: Kelsey L Bruso, Roseville, MN (US); James M Plasek, Roseville, MN (US)

(72) Inventors: Kelsey L Bruso, Roseville, MN (US); James M Plasek, Roseville, MN (US)

(73) Assignee: Unisys Corporation, Blue Bell, PA (US)

( * ) Notice: Subject to any disclaimer, the term of this patent is extended or adjusted under 35 U.S.C. 154(b) by 231 days.

(21) Appl. No.: 15/259,458

(22) Filed: Sep. 8, 2016

(65) Prior Publication Data
US 2017/0235790 A1  Aug. 17, 2017

Related U.S. Application Data

(60) Provisional application No. 62/296,124, filed on Feb. 17, 2016.

(51) Int. Cl.
   *G06F 16/242* (2019.01)
   *G06F 16/2455* (2019.01)
   *G06F 16/36* (2019.01)

(52) U.S. Cl.
   CPC ...... *G06F 16/2433* (2019.01); *G06F 16/2445* (2019.01); *G06F 16/2455* (2019.01); *G06F 16/367* (2019.01)

(58) Field of Classification Search
   None
   See application file for complete search history.

(56) References Cited

U.S. PATENT DOCUMENTS

| | | | | |
|---|---|---|---|---|
| 10,373,065 | B2* | 8/2019 | Suleiman | G06F 11/3447 |
| 2007/0162465 | A1* | 7/2007 | Cope | G06F 17/2247 |
| 2008/0301545 | A1* | 12/2008 | Zhang | G06F 17/212 715/235 |
| 2009/0138454 | A1* | 5/2009 | Rayner | G06F 16/313 |
| 2010/0218134 | A1* | 8/2010 | B'Far | G06Q 10/00 715/780 |
| 2012/0059842 | A1* | 3/2012 | Hille-Doering | G06F 16/3322 707/769 |
| 2013/0006968 | A1* | 1/2013 | Gusmini | G06F 17/30557 707/722 |
| 2013/0054621 | A1* | 2/2013 | Kretz | G06N 5/022 707/749 |
| 2015/0310096 | A1* | 10/2015 | Bao | G06F 16/367 707/738 |
| 2016/0140203 | A1* | 5/2016 | Fang | G06F 16/278 707/756 |
| 2016/0147736 | A1* | 5/2016 | Danielyan | G06F 17/2785 704/9 |
| 2017/0316096 | A1* | 11/2017 | Mukherjee | G06F 16/9535 |

* cited by examiner

*Primary Examiner* — Christopher J Raab

(57) ABSTRACT

An artificially intelligent method includes the steps of monitoring, by a processor, information sources to identify primary semantic information; capturing, by the processor, the primary semantic information; reformatting, by the processor, the primary semantic information according to a predetermined format; analyzing, by the processor, the primary semantic information to establish secondary semantic information; and establishing, by the processor, ontologies from the primary, secondary, and additional secondary semantic information.

20 Claims, 8 Drawing Sheets

100

Student 105

| ID | Name | Major |
|----|------|-------|
| 10 | Bob | 10 |
| 20 | Alice | 11 |
| 30 | John | 20 |
| 40 | Marsha | 20 |

110  115  120

125

Professor

| EmployeeID | EmployeeName | DepartmentID | Manager |
|------------|--------------|--------------|---------|
| 1000 | Neir | 10 | 1005 |
| 4001 | Lumberg | 40 | 6010 |
| 3050 | Stenberg | 30 | 6010 |
| 3066 | Miller | 30 | 3050 |
| 6010 | Kumar | 60 | |

Student ~205

| ID | Name | Major |
|---|---|---|
| 10 | Bob | 10 |
| 20 | Alice | 11 |
| 30 | John | 20 |
| 40 | Marsha | 20 |

210  215  220

200

Professor ~225

| EmployeeID | EmployeeName | DepartmentID | Manager |
|---|---|---|---|
| 1000 | Neir | 10 | 1005 |
| 4001 | Lumberg | 40 | 6010 |
| 3050 | Stenberg | 30 | 6010 |
| 3066 | Miller | 30 | 3050 |
| 6010 | Kumar | 60 | |

230  235  240  245

Department ~250

| ID | Name |
|---|---|
| 10 | Physics |
| 11 | English |
| 20 | Mathematics |
| 33 | History |
| 60 | Deans Office |

SYSTEMS AND METHODS FOR DERIVING DATABASE SEMANTIC INFORMATION USING ARTIFICIAL INTELLIGENCE

CROSS-REFERENCE TO RELATED APPLICATIONS

The present application claims priority to U.S. Provisional Patent Application No. 62/296,124, filed Feb. 17, 2016, and entitled "A System and Method for Deriving a Database's Semantic Information from Runtime Behavior of Queries", the disclosure of which is hereby incorporated by reference in its entirety.

FIELD OF THE DISCLOSURE

The instant disclosure relates generally to improvements of database functionality using ontology related artificial intelligence. More specifically, this disclosure relates to embodiments of apparatuses, systems, and methods that intelligently and automatically extracts semantic information from database runtime behaviors.

BACKGROUND

Ontology is a technical art in computer technologies that compartmentalizes variables required in complex computational processes and establishes the fundamental relationships among the variables. Usually an engineer or a programmer focuses his attention only to one aspect of a complex project. When different teams of engineers working on different aspects of one complex project, the semantic information can be buried in the overwhelming numbers of variables. For example, an semantic variable may have different names in different data tables of a database, making this variable difficult to identify. Extracting such semantic information is important in establishing the ontology.

Having the ontology of a database represents many benefits in computer technologies. In one aspect, the ontology information can be used to increase computational efficiencies. In another aspect, the ontology information can be used to automatically streamline compartmentalized instructions by reducing redundant variables to alleviate computational overhead of the database. In another aspect, ontology information may be used as an assistance to transform the mechanical processing of data variables of a database to a higher perceptive level that is helpful in developing artificially intelligent programs to make machine-learning decisions in areas, such as product sales, profits, costs, distribution logistics, customer behaviors, etc. In yet another aspect, ontology information may guide engineers and software developers to focus on sematic variables and shorten the time frames to develop new hardware and software products.

The embodiments disclosed herein describe artificial intelligence implemented ontology-driven hardware and software technologies that automatically extract semantic information from existing database and/or software runtime behaviors.

SUMMARY

The instant disclosure relates generally to improvements of database functionality using ontology related artificial intelligence. More specifically, this disclosure relates to embodiments of apparatuses, systems, and methods that intelligently and automatically extracts semantic information from database runtime behaviors. According to one embodiment of the disclosure, an artificially intelligent method includes the steps of: monitoring, by a processor, information sources to identify primary semantic information; capturing, by the processor, the primary semantic information; reformatting, by the processor, the primary semantic information according to a predetermined format; analyzing, by the processor, the primary semantic information to establish secondary semantic information; analyzing, by the processor, the secondary semantic information to establish additional secondary semantic information; and establishing, by the processor, ontologies from the primary, secondary, and additional secondary semantic information.

According to another embodiment of the disclosure, a computer program product includes a non-transitory computer-readable medium comprising instructions which, when executed by a processor, cause the processor to perform the steps of: monitoring information sources to identify primary semantic information; capturing the primary semantic information; reformatting the primary semantic information according to a predetermined format; analyzing the primary semantic information to establish secondary semantic information; analyzing the secondary semantic information to establish additional secondary semantic information; and establishing ontologies from the primary, secondary, and additional secondary semantic information.

According to another embodiment of the disclosure, an apparatus includes a memory; and a processor coupled to the memory, the processor being configured to perform the steps of: monitoring information sources to identify primary semantic information; capturing the primary semantic information; reformatting the primary semantic information according to a predetermined format; analyzing the primary semantic information to establish secondary semantic information; analyzing the secondary semantic information to establish additional secondary semantic information; and establishing ontologies from the primary, secondary, and additional secondary semantic information.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the concepts and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed systems and methods, reference is now made to the following descriptions taken in conjunction with the accompanying drawings.

FIG. 1 shows an example of two tables with semantic information embedded therein according to one embodiment of the disclosure.

FIG. 2 shows an example of three tables with semantic information embedded therein according to one embodiment of the disclosure.

DETAILED DESCRIPTION

Figure 3:
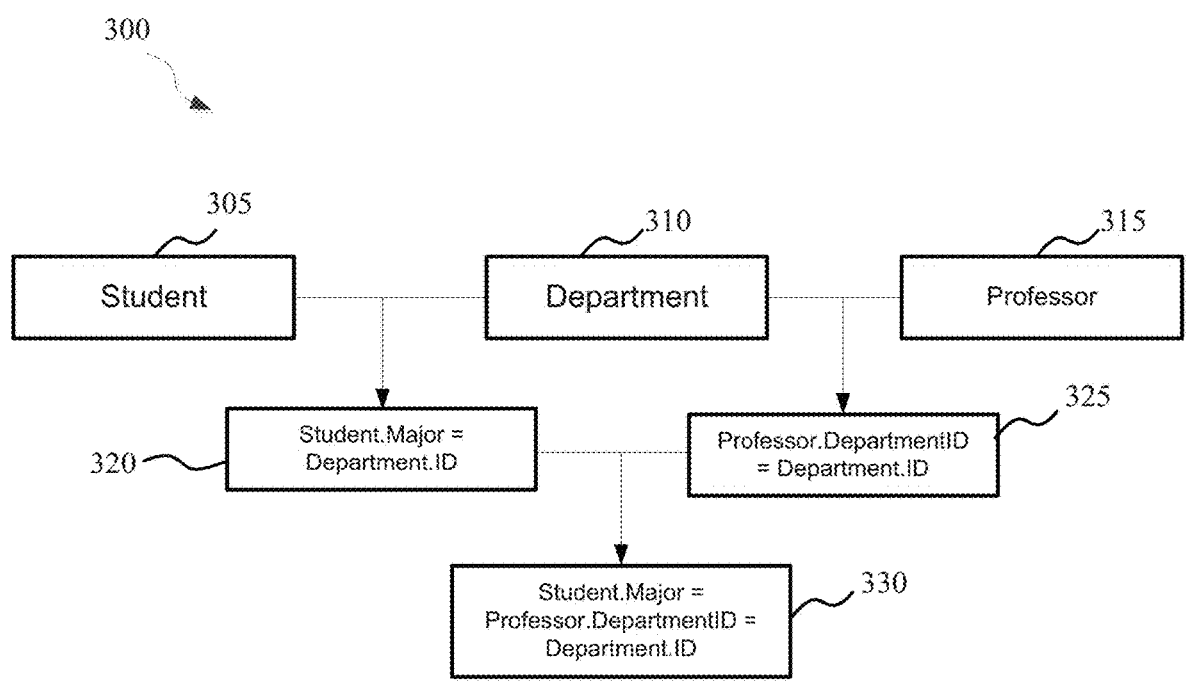
FIG. 3 shows an example of ontology extraction according to one embodiment of the disclosure.

The term "instruction" means a processor-executable instruction, for example, an instruction written as programming codes. An instruction may be executed by any suitable processor, for example, x86 processor. An instruction may be programed in any suitable computer language, for example, machine codes, assembly language codes, C language codes, C++ language codes, Fortran codes, Java codes, Matlab codes, COBOL codes, or the like. All methods, software and emulated hardware disclosed in this disclosure can be implemented as instructions.

The term "runtime" means the time when a database system is executing any instruction. The term "runtime behavior" means the actions a database system took during runtime. The actions may include, but is not limited to, reading data, writing data, deleting data, moving data, duplicating data, etc.

FIG. 1 shows an example 100 of two tables 105, 125 with semantic information embedded therein according to one embodiment of the disclosure. The example 100 includes a student table 105 and a professor table 125. It is noted that the tables 105 and 125 are used in this example for the mere purpose of illustrating the principle of semantic information, and are in no way limiting the scope of the disclosure.

The student table 105 includes three columns: the ID column 110, the Name column 115, and the Major column 120. The ID column 110 can be expressed as Student.ID 110. The name column 115 can be expressed as Student.Name 115. The major column 120 can be expressed as Student.Major 120.

Variables in Student.ID 110 are in a format of two numerical digits, e.g., 10, 20, 30, 40, etc. Variables in Student.Name 115 are in a format of text string, e.g., Bob, Alice, John, Marsha. Variables in Student.Major 120 are in a format of two numerical digits, e.g., 10, 11, 20, etc.

The professor table 125 includes four columns: the EmployedID column 130, the EmployeeName column 135, the DepartmentID column 140, and the Manager column 145. The EmployeeID column 130 can be expressed as Professor.EmployeeID 130. The EmployeeName column 135 can be expressed as Professor.EmployeeName 135. The DepartmentID column 140 can be expressed as Professor.DepartmentID 140. The Manager column 145 can be expressed as the Professor.Manager 145.

The variables in Professor.EmployeeID 130 are in a format of four numerical digits, e.g., 1000, 4001, etc. The variables in Professor.EmployeeNAME 135 are in a format of text string, e.g., Neir, Lumberg, etc. The variables in Professor.DepartmentID 140 are in a format of two numerical digits, e.g., 10, 40, 30, etc. The variables in Professor.Manager 145 are in a format of four numerical digits, e.g., 1005, 6010, etc.

In one embodiment, when looking for semantic information, the inter relationships of variables may be analyzed. One way of analyzing the variables is to compare the data formats of the variables. For example, if one variable in one table has the same data format as another variable in another table, then the two variables may actually be the same variable with different names. In another example, if one variable in one table has the same value as another variable in another table, then the two variables may actually be the same variable with different names. In yet another example, if two variables are called by an instruction interchangeably, then the two variables may be the same variable with different names.

In example 100, the following assumptions apply: (1) different variables in a single table are not redundant and (2) the relationships among variables in different tables are "equal," if any. These assumptions apply only to example 100 and do not limit the scope of the disclosure in any way.

As shown in FIG. 1, the Student.ID 110 and Student.Major 120 are both in the data format of two numerical digits. Professor.DeparmentID 140 is also in two numerical digit format. Thus, in one embodiment, by comparing the data formats, an artificially intelligent method may consider that both Student.Major 120 and Student.ID 110 are related to Professor.DepartmentID 140. In another embodiment, a method may conclude that Student.ID 110=Professor.DepartmentID 140, or Student.Major 120=Professor.DepartmentID 140. These inter relationships may or may not be accurate.

The embodiments disclosed herein illustrate the principles of ontology related artificially intelligent methods whereas the accuracy of extracted semantic information self-improves overtime when more data and/or runtime behaviors are observed. For instance, the example 200 in FIG. 2 uses an additional table compared to example 100 in FIG. 1, the Department table 250. With the Department table 250, a method according to one embodiment of this disclosure may decide that Student.ID 210=Professor.DepartmentID 240 is not a correct relationship, and yet Student.Major 220=Professor.DepartmentID 240 is a correct relationship.

FIG. 2 shows an example 200 of three tables with semantic information embedded therein according to one embodiment of the disclosure. The example 200 includes a student table 205, a professor table 225, and a department table 250. It is noted that the tables 205, 225, 250 are used in this example 200 for the mere purpose of illustrating the principle of semantic information, and are in no way limiting the scope of the disclosure.

The student table 205 includes three columns: the ID column 210, the Name column 215, and the Major column 220. The ID column 210 can be expressed as Student.ID 210. The name column 215 can be expressed as Student.Name 215. The major column 220 can be expressed as Student.Major 220.

Variables in Student.ID 210 are in a format of two numerical digits, e.g., 10, 20, 30, 40, etc. Variables in Student.Name 215 are in a format of text string, e.g., Bob, Alice, John, Marsha. Variables in Student.Major 220 are in a format of two numerical digits, e.g., 10, 11, 20, etc.

The professor table 225 includes four columns: the EmployeeID column 230, the EmployeeName column 235, the DepartmentID column 240, and the Manager column 245. The EmployeeID column 230 can be expressed as Professor.EmployeeID 230. The EmployeeName column 235 can be expressed as Professor.EmployeeName 235. The DepartmentID column 240 can be expressed as Professor.DepartmentID 240. The Manager column 245 can be expressed as the Professor.Manager 245.

The variables in Professor.EmployeeID 230 are in a format of four numerical digits, e.g., 1000, 4001, etc. The variables in Professor.EmployeeNAME 235 are in a format of text string, e.g., Neir, Lumberg, etc. The variables in Professor.DepartmentID 240 are in a format of two numerical digits, e.g., 10, 40, 30, etc. The variables in Professor.Manager 245 are in a format of four numerical digits, e.g., 1005, 6010, etc.

The Department table 250 includes two columns: the ID column 255 and the Name column 260. The ID column 255 can be expressed as Department.ID 255. The Name column 260 can be expressed as Department.Name 260.

The variables in Department.ID 255 are in a format of two numerical digits, e.g., 10, 11, 20, 33, 60, etc. The variables in Department.Name 260 are in a format of text string, e.g., Physics, English, Mathematics, etc.

In one embodiment, when looking for semantic information, the inter relationships of variables may be analyzed. Different methods can be applied to analyze the inter relationships of variables. One way of analyzing the variables is to compare the data formats of the variables. For example, if one variable in one table has the same data format as another variable in another table, then the two variables may actually be the same variable. In another example, if one variable in one table has the same value as another variable in another table, then the two variables may actually be the same variable. In yet another example, if two variables are called by an instruction interchangeably, then the two variables may be the same variable. In yet another example, the values of the variables in one table can be compared with the values of other variables in another table to examine the correlations.

In example 200, the following assumptions apply: (1) different variables in a single table are not redundant and (2) the relationships among variables in different tables are "equal," if any. These assumptions apply only to example 200 and do not limit the scope of the disclosure in any way.

Two or more different approaches may be combined to provide more accurate results than applying just a single approach. For example, in one embodiment, as shown in FIG. 2, the approach of comparing data format may be applied first. Similar to example 100, comparing data formats of the student table 205, professor table 225, and department table 250 can find out that Student.ID 210, Student.Major 220, Professor.DepartmentID 240, and Department.ID 225 are all in the same data format. Applying the assumptions, an artificially intelligent method may find the following two possible relationships (1) Student.ID 210=Professor.DepartmentID 240=Department.ID 255 or (2) Student.Major 220=Professor.DepartmentID 240=Department.ID 255. At this point, a second approach, comparing values, can be further applied. By comparing the values of Student.ID 210, Student.Major 220, Professor.DepartmentID 240, and Department.ID 225, the method can find out that all the values of Student.Major 220 can match with the values of Department.ID, i.e., 10, 11, and 20. On the other hand, Student.ID 210 has two values, i.e., 30 and 40, that cannot be found in Department.ID 255. Therefore, the relationship of Student.Major 220=Professor.DepartmentID 240=Department.ID 255 may be correct, and yet the relationship of Student.ID 210=Professor.DepartmentID 240=Department.ID 255 may not be correct.

As shown in FIG. 2, crosslinking relationships exist among the tables, e.g., Student.Major 220=Professor.DepartmentID 240=Department.ID 255. Such crosslinking of tables is important semantic information in a database such as a relational database management system (RDBMS).

In one embodiment, by looking for the specific coding instructions of the RDBMSes that establish the crosslinks among tables may be another approach to find out semantic information. In one embodiment, when programming, RDBMSes may have the ability to crosslink tables using a "FOREIGN KEY" instruction. The following exemplary instructions create the tables shown in FIG. 2 and establish the crosslinks using the syntax "FOREIGN KEY."

In one embodiment, the student table 205 can be created with the following instructions:

```
CREATE  TABLE student (
id            NUMBER PRIMARY KEY,
name          VARCHAR2(200),
major         NUMBER NOT NULL,
CONSTRAINT fk_student_dept FOREIGN KEY (major)
              REFERENCES department (id));
```

By looking for the FOREIGN KEY instruction in the above example, an artificial intelligence method may find that Student.Major 220 is linked to Department.ID 255.

In another embodiment, the professor table 225 can be created with the following instructions:

```
CREATE TABLE professor (
employeeid      NUMBER PRIMARY KEY,
employeename    VARCHAR2(200),
departmentid    NUMBER NOT NULL,
manager    NUMBER,
CONSTRAINT fk_prof_dept FOREIGN KEY (departmentid)
              REFERENCES department (id));
```

By looking for the FOREIGN KEY instruction in the above example, the artificial intelligence method may find that Professor.DepartmentID 240 is linked to Department.ID 255.

In another embodiment, the department table 250 can be created with the following instructions:

```
CREATE  TABLE department (
id            NUMBER PRIMARY KEY,
name          VARCHAR2(200));
```

Therefore by looking for FOREIGN KEY instruction, the artificial intelligence method may first find out the semantic information of Student.Major 220=DepartmentID 255 and Professor.DepartmentID 240=Department.ID 255. Hence, the ontology information of Student.Major 220=Department.ID 255=Professor.DepartmentID 240 can be inferred. It is noted the specific instruction "FOREIGN KEY" is only an example and does not limit the scope of the disclosure in any way. Any instruction language establishing crosslinks among variables can be used by the embodiments disclosed herein in a similar way.

In other embodiments, if the instructions of the databases in interest are not available, the crosslinking relationship may be inferred from other runtime behaviors. Additional examples are provided in FIGS. 4 and 5 to illustrate this principle.

FIG. 3 shows an example 300 of ontology extraction according to one embodiment of the disclosure. As shown in FIG. 3, there are student database 305, department database 310, and professor database 315. A semantic information Student.Major=Department.ID 320 exists between the student database 305 and department database 310. Another semantic information Professor.DepartmentID=Department.ID 325 exists between department database 310 and professor database 315. The semantic information Student.Major=Department.ID 320 and Professor.DepartmentID=Department.ID 325 are primary semantic information observed from the databases themselves. In the example 300, after having the primary semantic information, a secondary semantic information can be inferred or extracted as Student.Major=Department.ID=Department.ID 330.

The term "primary semantic information" refers to semantic information captured from actual information sources of a database. Such information sources may include, for example, database runtime behaviors, query execution plan, stored procedure definition, embedded SQL (structured query language) statements in application programs, JDBC (Java Database Connectivity) or ODBC (Open Database Connectivity) queries, trigger definition, and other potential instruction codes.

The term "secondary semantic information" refers to semantic information established or inferred based on other semantic information, e.g., primary semantic information and/or other secondary semantic information. For example, in FIG. 3, Student.Major=Professor.Department.ID=Department.ID 330 is a secondary semantic information because it is inferred from the primary semantic information of Student.Major=Department.ID 320 and Professor.DepartmentID=Department.ID 325.

Figure 4:
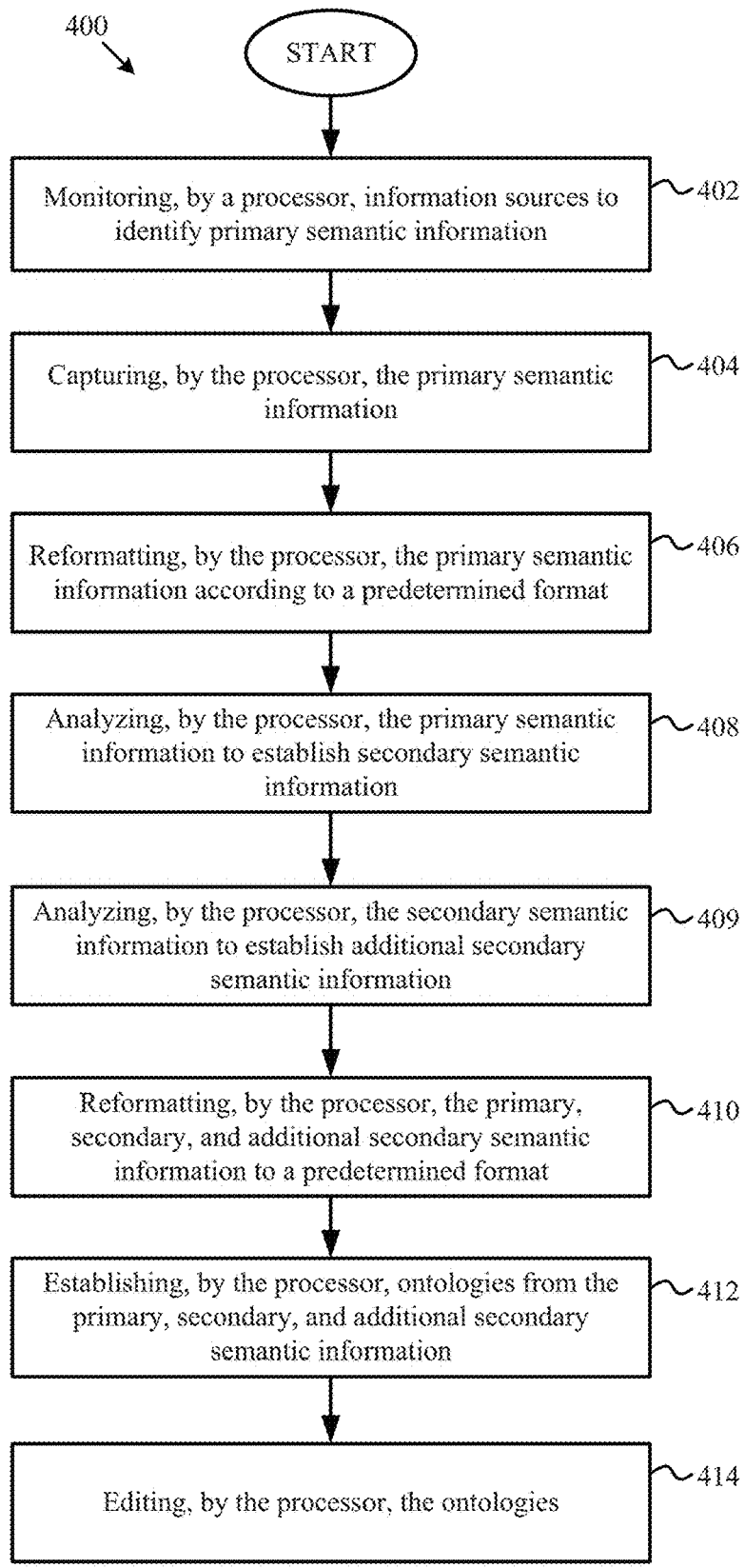
FIG. 4 shows a method for extracting ontology according to one embodiment of the disclosure.

FIG. 4 shows a method 400 for extracting ontology according to one embodiment of the disclosure. The method 400 may be applied to the example 100 in FIG. 1. The method 400 may be applied to the example 200 in FIG. 2. The method 400 may be applied to the example 300 in FIG. 3 of ontology extraction. The method 400 may include the exemplary information sources 500 in FIG. 5. The method 400 may be implemented in the computer network 600 in FIG. 6. The method 400 may be implemented in the computer system 700 in FIG. 7. The method 400 may be implemented in the servers 800 and 850 in FIGS. 8A and 8B.

The method 400 includes monitoring, by a processor, information sources to identify primary semantic information 402. The method 400 includes capturing, by the processor, the primary semantic information 404. The method 400 includes reformatting, by the processor, the primary semantic information according to a predetermined format 406. The method 400 includes analyzing, by the processor, the primary semantic information to establish secondary semantic information 408. The method 400 includes analyzing, by the processor, the secondary semantic information to establish additional secondary semantic information 409. The method 400 includes reformatting, by the processor, the primary, secondary, and additional secondary semantic information to a predetermined format 410. The method 400 includes establishing, by the processor, ontologies from the primary, secondary, and additional secondary semantic information 412. And, the method 400 includes editing, by the processor, the ontologies 414.

At 402, the method monitors, by a processor, information sources to identify primary semantic information. These information sources may include query execution plan 502, stored procedure instructions 504, embedded SQL, statements in application programs 506, JDBC or ODBC queries, and trigger expressions 510. The above mentioned sources regulate how variables in database tables are accessed, edited, deleted, distributed, etc. At 402, by monitoring these sources, the method 400 can capture the runtime behaviors of the database and identify the potential semantic information.

In one embodiment, the primary semantic information is identified by looking for foreign key and/or reference constraints. The terms "foreign key constraint" and "reference constraint" mean a variable in one table being referred to another variable. Foreign keys or references may refer a variable to another variable in the same or a different table. The foreign key and reference constraints provide valuable information identifying logically related tables and/or variables. In one embodiment, the foreign key of one table refers to a variable of another table. In yet another embodiment, the foreign key of one table refers to a variable of the same table, a self-referring table.

In one embodiment, the primary semantic information is identified by looking for check constraints. The term "check constraints" means instructions checking the data to make sure that the data satisfies certain logical rules. For example, a quantity of goods cannot be a negative number, a price cannot be a negative number, total number of students cannot be a negative number, etc. Such check constraints set out the logical rules for a set of data. These logical rules may provide useful clues for finding semantic information.

In one embodiment, the primary semantic information is identified by looking for trigger expressions. The term "trigger expression" means one or more actions that will be executed if a triggering event is satisfied. For example, a triggering event can be a price of goods being negative. The actions that will be executed can be insert, delete, or update the variables that trigger the actions with correct values.

In one embodiment, the primary semantic information is identified by looking for "connected by" expression, "recursive" expression, "transitive_closure" expression, or "with recursive" expressions. "Connected by," "recursive," "transitive_closure," "with recursive" expressions may specify the hierarchical relationships among tables and/or variables. For example, a relationship between parent rows and child rows.

Figure 5:
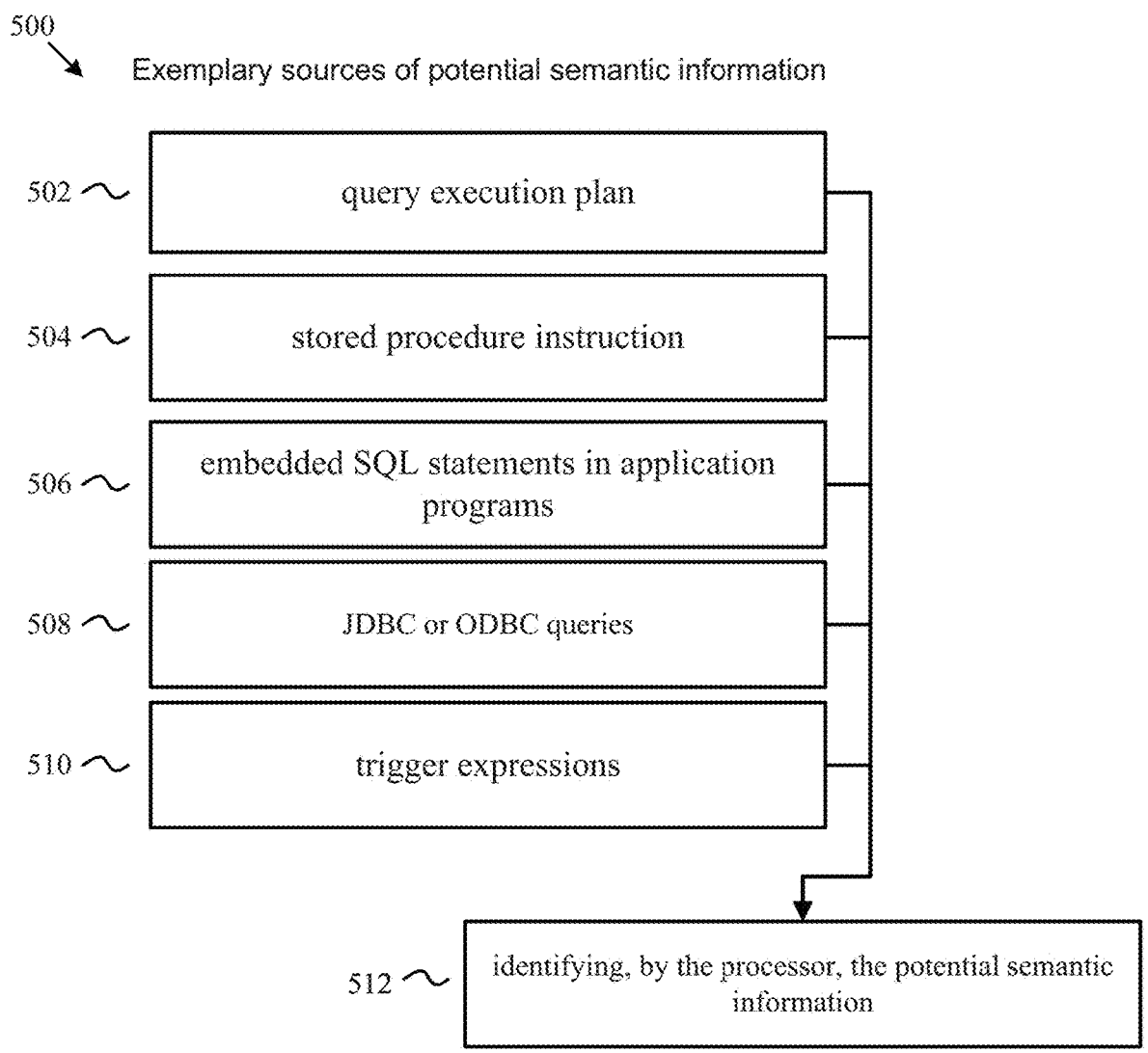
FIG. 5 shows exemplary information sources of semantic information according to one embodiment of the disclosure.

At 404, the method 400 captures, by the processor, the primary semantic information. Once the primary semantic information is identified in 402, the method captures the semantic information 404. The captured information may include, the specific instruction executed in the information sources, as shown in FIG. 5. The captured information may also include the value of the variable accessed, the metadata of the table, the row description, the column description, the table description, the relationships among variables, the relationships among tables, the relationships among databases, etc.

At 406, the method 400 reformats, by the processor, the primary semantic information according to a predetermined format. In one embodiment, the primary semantic information is reformatted with Web Ontology Language (OWL).

At 408, the method 400 analyzes, by the processor, the primary semantic information to establish secondary semantic information. After primary semantic information are extracted from runtime behaviors of databases, the method 400 may infer secondary semantic information based on primary semantic information. In another embodiment, the secondary semantic information may be inferred from other secondary information.

At 409, the method 400 analyzes, by the processor, the secondary semantic information to establish additional secondary semantic information 409. The secondary semantic information established in 408, can be further used in derive additional secondary semantic information at 409. This reiteration of analyzing secondary semantic information to establish additional secondary semantic information can be useful in extracting ontologies of a large scale database.

At 410, the method 400 reformats, by the processor, the primary, secondary, and additional secondary semantic information to a predetermined format. In one embodiment, the secondary semantic information is reformatted with Web Ontology Language (OWL).

At 412, the method 400 establishes, by the processor, ontologies from the primary, secondary, and additional secondary semantic information.

At 414, the method 400 edits, by the processor, the ontologies. The ontologies can be edited for difference purposes, for example, data presentations, commercial decisions, information technology team meetings, research and development projects, etc.

FIG. 5 shows exemplary sources 500 of potential semantic information according to one embodiment of the disclosure. In one embodiment, the sources of potential semantic information 502, 504, 506, 508, and/or 510 are included in the process 402 in FIG. 4. It is specifically noted that the information collected from information sources 502, 504, 506, 508, and 510 may be used separately or in any combination thereof to provide a fuller picture of the semantic information.

In one embodiment, the source of potential semantic information is query execution plan 502. In one embodiment, the query execution plan can be created by the RDBMS for executing an SQL statement. In one embodiment, a database in interest may provide mechanisms to report these query execution plans, e.g., explain statement, show query execution plan statement, etc. In another embodiment, a database in interest may write the query plan into an execution table, a file, or into a stream resulting from the user query. In one embodiment, the query execution plan is dynamically built during runtime, not a static script of instructions.

Monitoring query execution plan as in 502 and/or 402 as a source of semantic information has the following benefits which improve the functionality of a database management. In one embodiment, query execution plan 502 can be built dynamically by static instructions. Thus, the query execution plan 502 may reflect the variable inter-relationships actually being used by a certain application during runtime. Monitoring the dynamically changing query execution plan 502 provides an approach to capture database runtime behavior. In another embodiment, query execution plan 502 may be compiled from different coding languages to a uniform query execution plan language. In yet another embodiment, query execution plans 502 may be compiled from different languages to have homogenized coding structures making decomposing the query execution plan 502 more computationally efficient. In one embodiment, a database may include query execution plan optimizer, that may homogenize the coding structure of the query execution plan 502.

The stored procedure instruction 504 is another information source of semantic information. The stored procedure instruction 504 includes the static programming codes, e.g., JAVA, C language, SQL, etc. The database in interest may keep the stored procedure instructions 504 somewhere as designated by the database administrator and by application developers. By examining the stored procedure instruction 504, tables and/or variables referenced in the instruction can be derived. Which may be semantic information.

In one embodiment, the stored procedure instruction 504 includes explicit referential integrity constraints, such as foreign key, reference key, etc. These referential integrity constraints may indicate the inter relationships among tables, which may be semantic information.

However, in the situation, when the stored procedure instructions 504 is not available or not informative e.g., does not include referential integrity constraints), query execution plan 502 may be preferred. Query execution plan 502 reflects the runtime behaviors, for example, the actual plan to access, read, modify, write, check, delete, a certain variable in a certain table. Such runtime behaviors may lead to semantic information such as related tables, crosslinks, equal variables, logical relationships between variables and tables, etc.

By capturing and examining the query execution plan 502, an artificially intelligent method according to this disclosure may extract the actual usage pattern of tables and/or variables to determine the hierarchical relationships among them. Such hierarchical information among tables may be semantic information.

However, when stored procedure instructions 504 are available, stored procedure instructions 504 may provide valuable perspective or hints in extracting semantic information. In some embodiments, the stored procedure instructions 504 and query execution plan 502 may be used together to provide a fuller picture of the semantic information.

Embedded SQL statements in application programs 506 are another source of potential semantic information. Embedded SQL statements 506 appear in various application programs coded with different languages, for example, COBOL, and C language. These application programs include embedded SQL statements 506 such that they can access the designated set of tables in the database. These embedded SQL statements may be sub-functions called by its main program. These embedded SQL statements 506 may provide valuable semantic information. In one embodiment, key variables are accessed through the embedded SQL statements 506. In one embodiment, table hierarchy is indicated in the embedded SQL statements 506. In other embodiments, table references, column references, variable comparing expressions, literal values, etc. may appear in the embedded SQL statements 506.

It is possible that some programming languages, such as JAVA, do not support SQL, instead, they support JDBC and/or ODBC. These JDBC and/or ODBC queries 508 may also provide valuable semantic information. In one embodiment, key variables are accessed through the JDBC and/or ODBC queries 508. In one embodiment, table hierarchy is indicated in the JDBC and/or ODBC queries 508. In other embodiments, table references, column references, variable comparing expressions, literal values, etc may appear in the JDBC and/or ODBC queries 508.

Trigger expressions 510 may also be a source of potential semantic information. Trigger expressions 510 define one or more actions that will be executed on a database if a triggering event is satisfied. For example, a triggering event can be a value of a variable being over or below a threshold. The actions that may be executed can be insert, delete, or update the variable in interest. The actions described in the trigger expressions 510 can include references between and among the database tables which show semantic relationships. In one embodiment, key variables are indicated in the trigger expressions 510. In one embodiment, table hierarchy is indicated in the trigger expressions 510. In other embodiments, table references, column references, variable comparing expressions, literal values, etc may appear in the trigger expressions 510.

The information collected from the information sources 502, 504, 506, 508, 510 are collected by an artificially intelligent method according to one embodiment of the disclosure, for identifying the potential semantic information 512. In another embodiment, the information collected from the information sources 502, 504, 506, 508, 510 are collected by a method 400 according to one embodiment of the disclosure, for identifying the potential semantic information in step 402. The information collected from information sources 502, 504, 506, 508, and 510 may be used separately or in any combination to provide a fuller picture of the semantic information.

Figure 6:
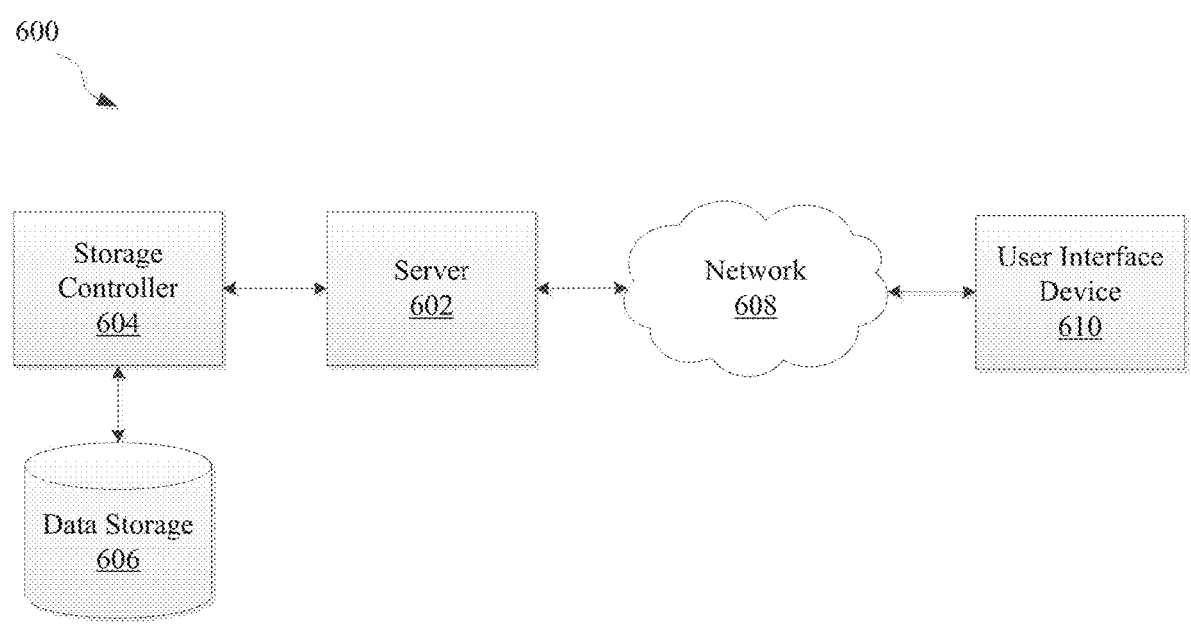
FIG. 6 shows an exemplary block diagram illustrating a computer network according to one embodiment of the disclosure.

FIG. 6 illustrates a computer network 600 for obtaining access to database files in a computing system according to one embodiment of the disclosure. The computer network 600 may implement the example 100 in FIG. 1. The computer network 600 may implement the example 200 in FIG. 2. The computer network 600 may implement the example 300 in FIG. 3. The computer network 600 may implement the method 400 in FIG. 4. The computer network 600 may include and/or monitor the sources of potential semantic information 500 in FIG. 5.

FIG. 6 illustrates a computer network 600 for obtaining access to database files in a computing system according to one embodiment of the disclosure. The computer network 600 may include a server 602, a data storage device 606, a network 608, and a user interface device 610. The server 602 may also be a hypervisor-based system executing one or more guest partitions hosting operating systems with modules having server configuration information. In a further embodiment, the computer network 600 may include a storage controller 604, or a storage server configured to manage data communications between the data storage device 606 and the server 602 or other components in communication with the network 608. In an alternative embodiment, the storage controller 604 may be coupled to the network 608.

In one embodiment, the user interface device 610 is referred to broadly and is intended to encompass a suitable processor-based device such as a desktop computer, a laptop computer, a personal digital assistant (PDA) or tablet computer, a smartphone or other mobile communication device having access to the network 608. In a further embodiment, the user interface device 610 may access the Internet or other wide area or local area network to access a web application or web service hosted by the server 602 and may provide a user interface for enabling a user to enter or receive information.

The network 608 may facilitate communications of data between the server 602 and the user interface device 610. The network 608 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

In one embodiment, the user interface device 610 accesses the server 602 through an intermediate sever (not shown). For example, in a cloud application the user interface device 610 may access an application server. The application server fulfills requests from the user interface device 610 by accessing a database management system (DBMS). In this embodiment, the user interface device 610 may be a computer or phone executing a Java application making requests to a JBOSS server executing on a Linux server, which fulfills the requests by accessing a relational database management system (RDBMS) on a mainframe server.

Figure 7:
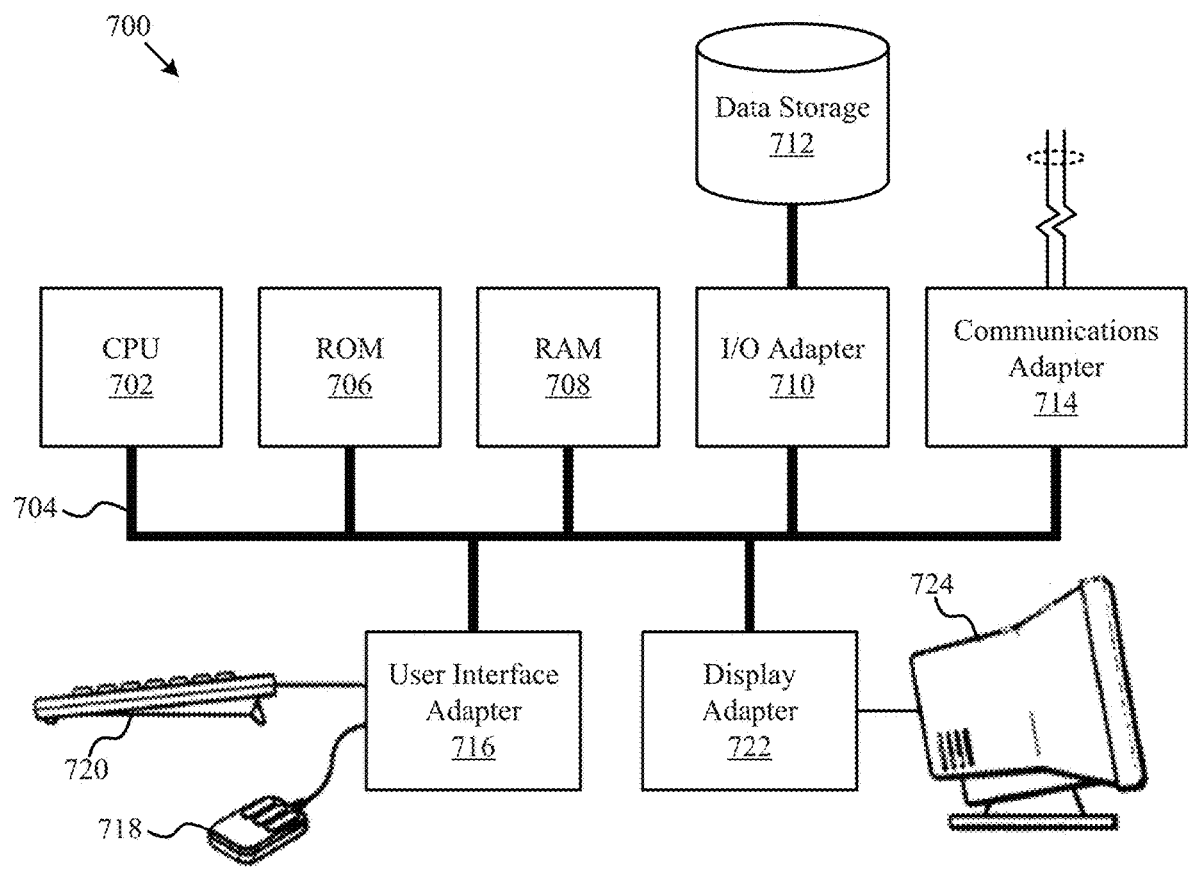
FIG. 7 shows a block diagram illustrating a computer system according to one embodiment of the disclosure.

FIG. 7 illustrates a computer system 700. The computer system 700 may implement the example 100 in FIG. 1. The computer system 700 may implement the example 200 in FIG. 2. The computer system 700 may implement the example 300 in FIG. 3. The computer system 700 may implement the method 400 in FIG. 4. The computer system 700 may include and/or monitor the sources of potential semantic information 500 in FIG. 5.

FIG. 7 illustrates a computer system 700 adapted according to certain embodiments of the server 602 and/or the user interface device 610. The central processing unit ("CPU") 702 is coupled to the system bus 704. The CPU 702 may be a general purpose CPU or microprocessor, graphics processing unit ("GPU"), and/or microcontroller. The present embodiments are not restricted by the architecture of the CPU 702 so long as the CPU 702, whether directly or indirectly, supports the operations as described herein. The CPU 702 may execute the various logical instructions according to the present embodiments.

The computer system 700 may also include random access memory (RAM) 708, which may be synchronous RAM (SRAM), dynamic RAM (DRAM), synchronous dynamic RAM (SDRAM), or the like. The computer system 700 may utilize RAM 708 to store the various data structures used by a software application. The computer system 700 may also include read only memory (ROM) 706 which may be PROM, EPROM, EEPROM, optical storage, or the like. The ROM may store configuration information for booting the computer system 700. The RAM 708 and the ROM 706 hold user and system data, and both the RAM 708 and the ROM 706 may be randomly accessed.

The computer system 700 may also include an I/O adapter 710, a communications adapter 714, a user interface adapter 716, and a display adapter 722. The I/O adapter 710 and/or the user interface adapter 716 may, in certain embodiments, enable a user to interact with the computer system 700. In a further embodiment, the display adapter 722 may display a graphical user interface (GUI) associated with a software or web-based application on a display device 724, such as a monitor or touch screen.

The I/O adapter 710 may couple one or more storage devices 712, such as one or more of a hard drive, a solid state storage device, a flash drive, a compact disc (CD) drive, a floppy disk drive, and a tape drive, to the computer system 700. According to one embodiment, the data storage 712 may be a separate server coupled to the computer system 700 through a network connection to the I/O adapter 710. The communications adapter 714 may be adapted to couple the computer system 700 to the network 608, which may be one or more of a LAN, WAN, and/or the Internet. The user interface adapter 716 couples user input devices, such as a keyboard 720, a pointing device 718, and/or a touch screen (not shown) to the computer system 700. The display adapter 722 may be driven by the CPU 702 to control the display on the display device 724. Any of the devices 702-722 may be physical and/or logical.

The applications of the present disclosure are not limited to the architecture of computer system 700. Rather the computer system 700 is provided as an example of one type of computing device that may be adapted to perform the functions of the server 602 and/or the user interface device 710. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 700 may be virtualized for access by multiple users and/or applications.

Figure 8A:
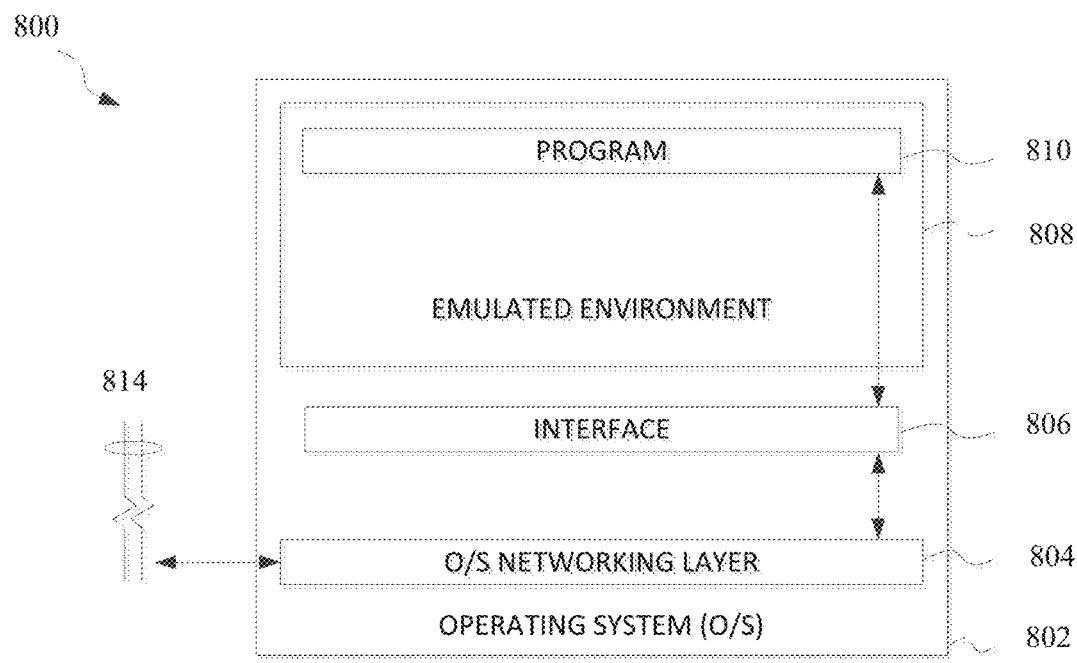
FIG. 8A shows a block diagram illustrating a server hosting an emulated software environment for virtualization according to one embodiment of the disclosure.
Figure 8B:
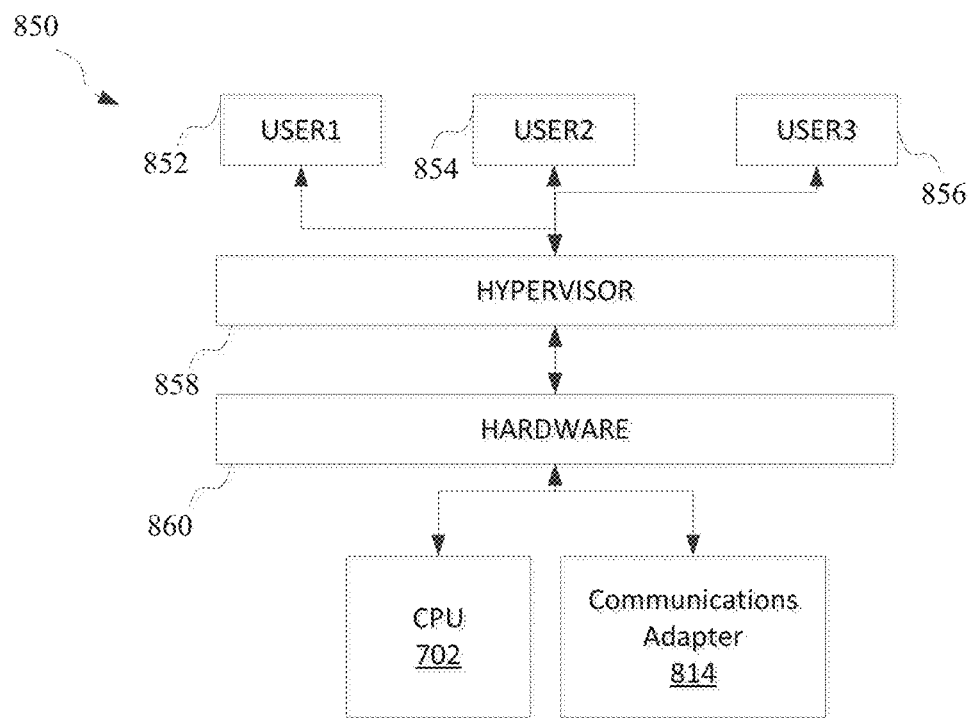
FIG. 8B shows a block diagram illustrating a server hosting an emulated hardware environment according to one embodiment of the disclosure.

FIGS. 8A and 8B show servers 800 and 850 hosting emulated software and hardware, respectively. The servers 800 and 850 may implement the example 100 in FIG. 1. The servers 800 and 850 may implement the example 200 in FIG. 2. The servers 800 and 850 may implement the example 300 in FIG. 3. The servers 800 and 850 may implement the method 400 in FIG. 4. The servers 800 and 850 may include and/or monitor the sources of potential semantic information 500 in FIG. 5.

FIG. 8A is a block diagram illustrating a server 800 hosting an emulated software environment for virtualization according to one embodiment of the disclosure. An operating system 802 executing on a server 800 includes drivers for accessing hardware components, such as a networking layer 804 for accessing the communications adapter 814. The operating system 802 may be, for example, Linux or Windows. An emulated environment 808 in the operating system 802 executes a program 810, such as Communications Platform (CPComm) or Communications Platform for Open Systems (CPCommOS). The program 810 accesses the networking layer 804 of the operating system 802 through a non-emulated interface 806, such as extended network input output processor (XNIOP). The non-emulated interface 806 translates requests from the program 810 executing in the emulated environment 808 for the networking layer 804 of the operating system 802.

In another example, hardware in a computer system may be virtualized through a hypervisor. FIG. 8B is a block diagram illustrating a server 850 hosting an emulated hardware environment according to one embodiment of the disclosure. Users 852, 854, 856 may access the hardware 860 through a hypervisor 858. The hypervisor 858 may be integrated with the hardware 858 to provide virtualization of the hardware 858 without an operating system, such as in the configuration illustrated in FIG. 8A. The hypervisor 858 may provide access to the hardware 858, including the CPU 702 and the communications adaptor 814.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method performed by a processor during runtime of a database, comprising:
monitoring information sources that regulate how variables in database tables are affected to find a foreign key constraint and using the foreign key constraint to identify primary semantic information;
extracting the primary semantic information;
analyzing the primary semantic information to establish secondary semantic information, wherein the secondary semantic information is not directly presented in the information sources;
extracting the secondary semantic information; and
establishing, by the processor, ontologies from the primary semantic information and the secondary semantic information.

2. The method according to claim 1, wherein extracting the primary semantic information includes extracting the primary semantic information from runtime behaviors of a database, the runtime behaviors including reading data, wilting data, deleting data, moving data and duplicating data.

3. The method according to claim 1, wherein analyzing includes inferring, by the processor, crosslinking relationships from the primary semantic information, wherein the crosslinking relationships are not directly presented in the information sources.

4. The method according to claim 1, wherein the information sources include an embedded SQL statement in an application program.

5. The method according to claim 1, wherein the information sources include a JDBC or ODBC query.

6. The method according to claim 1, wherein the information sources include a trigger expression.

7. The method according to claim 1, further including editing, by the processor, the ontologies.

8. A computer program product, comprising:
a non-transitory computer-readable medium comprising instructions which, when executed by a processor, cause the processor to perform the steps of:
monitoring information sources that regulate how variables in database tables are affected to find a foreign key constraint and using the foreign key constraint to identify primary semantic information;
extracting the primary semantic information and reformatting the primary semantic information to a predetermined format;
analyzing the primary semantic information to establish secondary semantic information, wherein the secondary semantic information is not directly presented in the information sources;
extracting the secondary semantic information and reformatting the second semantic information to the predetermined format;
and
establishing, by the processor, ontologies from the primary semantic information and the secondary semantic information.

9. The computer program product of claim 8, wherein the information sources include a query execution plan.

10. The computer program product of claim 8, wherein the information sources include a stored procedure instruction.

11. The computer program product of claim 8, wherein the information sources include an embedded SQL statement in an application program.

12. The computer program product of claim 8, wherein the information sources include a JDBC or ODBC query.

13. The computer program product of claim 8, wherein the information sources include a trigger expression.

14. The computer program product of claim 8, wherein the steps further include editing, by the processor, the ontologies.

15. An apparatus, comprising:
a memory; and
a processor coupled to the memory, the processor being configured to perform the steps of:
monitoring information sources that regulate how variables in database tables are affected to find a foreign key constraint and using the foreign key constraint to identify primary semantic information;
extracting the primary semantic information and reformatting the primary semantic information to a predetermined format;
analyzing the primary semantic information to establish secondary semantic information, wherein the secondary semantic information is not directly presented in the information sources;
extracting the secondary semantic information and reformatting the secondary semantic information to the predetermined format;
and
establishing, by the processor, ontologies from the primary semantic information and the secondary semantic information.

16. The apparatus of claim 15, wherein the information sources include a query execution plan.

17. The apparatus of claim 15, wherein the information sources include a stored procedure instruction.

18. The apparatus of claim 15, wherein the information sources include an embedded SQL statement in an application program.

19. The apparatus of claim 15, wherein the information sources include a JDBC or ODBC query.

20. The method of claim 1, wherein the primary semantic information and the secondary semantic information are reformatted to a predetermined format.

* * * * *